United States Patent

Ishizuka

[11] Patent Number: 5,606,475
[45] Date of Patent: Feb. 25, 1997

[54] MAGNETIC DISC DRIVE MOTOR INCLUDING A FIXED SHAFT HAVING MOUNTED THEREON A LOWER BEARING MEMBER WITH A PORTION FOR MOUNTING A ROTOR

[75] Inventor: Yutaka Ishizuka, Nagano, Japan

[73] Assignee: Kabushiki Kaisha Sanyo Seiki Seisakusho, Nagano, Japan

[21] Appl. No.: 555,307

[22] Filed: Nov. 8, 1995

Related U.S. Application Data

[63] Continuation of Ser. No. 133,878, Oct. 12, 1993, abandoned.

[30] Foreign Application Priority Data

Oct. 12, 1992 [JP] Japan ................................ 4-298210

[51] Int. Cl.$^6$ ............................ G11B 17/02; H02K 5/16; H02K 29/00
[52] U.S. Cl. ........................ 360/99.08; 310/90; 384/543
[58] Field of Search ........................ 360/99.08, 99.12, 360/98.07; 369/263, 269, 270; 384/537, 543, 581, 584, 585, 512; 310/90, 67 R

[56] References Cited

U.S. PATENT DOCUMENTS

| | | | |
|---|---|---|---|
| 2,274,779 | 3/1942 | Davis | 384/537 |
| 3,431,525 | 3/1969 | Buntschuh et al. | 310/90 |
| 4,810,108 | 3/1989 | Yajima | 384/537 |
| 4,858,044 | 8/1989 | Crapo | 360/99.08 |
| 4,958,945 | 9/1990 | Nakanishi | 384/543 |
| 5,045,738 | 9/1991 | Hishida et al. | 310/90 |
| 5,128,571 | 7/1992 | Itsu | 310/90 |
| 5,207,514 | 5/1993 | Weissgerber | 384/537 |

FOREIGN PATENT DOCUMENTS

| | | | |
|---|---|---|---|
| 4168948 | 6/1992 | Japan | 310/90 |
| 4317546 | 11/1992 | Japan | 310/90 |

*Primary Examiner*—Robert S. Tupper
*Assistant Examiner*—Brian E. Miller
*Attorney, Agent, or Firm*—Sughrue, Mion, Zinn, Macpeak & Seas

[57] ABSTRACT

A magnetic disc drive motor contains a frame; a fixed shaft mounted on the frame; a lower bearing member mounted on a lower portion of the fixed shaft, the lower bearing member being provided with a roller ring rotating about the fixed shaft, the lower bearing member being provided with a loading portion defined at one end of the roller ring; an upper bearing member mounted on the upper portion of the fixed shaft, the upper bearing member being provided with a cylindrical roller ring; and a motor including: a rotor fixed under a loading surface portion of the loading portion of the lower bearing member; and a stator disposed inside the rotor and fixed to a frame, wherein each of the roller rings is fitted in the center hole of a magnetic disc and an inner peripheral portion of the magnetic discs are loaded on the loading portion.

1 Claim, 3 Drawing Sheets

MAGNETIC DISC DRIVE MOTOR INCLUDING A FIXED SHAFT HAVING MOUNTED THEREON A LOWER BEARING MEMBER WITH A PORTION FOR MOUNTING A ROTOR

This is a continuation of application Ser. No. 08/133,878 filed Oct. 12, 1993 now Abn.

BACKGROUND OF THE INVENTION

1. Field of the Invention

This invention relates to a magnetic disc drive motor, and particularly relates to a rotating support device for rotatably supporting a magnetic disc.

2. Related Art

The conventional magnetic disc motors built into hard disc drive devices are shown in FIGS. 5 and 6. In the magnetic disc drive motor shown in FIG. 5, a shaft 2 is mounted in a frame 1, and ball bearings 3, 3 are fixedly mounted on the shaft 2. A hub 4 is mounted on the ball bearings 3, 3. The central portion of the hub 4 is cylindrical-shaped. The cylindrical central portion is open at its upper and lower ends, and magnetic discs 5 are mounted on the outer peripheral surface of the cylindrical central portion. A seal cover 6 covers the opening at the upper end of the hub 4 and is fixed in position there by an adhesive 7.

An armature core 8 is mounted on the frame 1, and a drive magnet 9 is fixed on the inner surface of the cylindrical peripheral portion of the hub 4. The armature core 8 has a number of salient poles, and a coil 10 is wound around each of the salient poles. The outer surface of the armature core 8 faces the inner surface of the drive magnet 9 across a radial gap. When the armature core 8 is excited with an electric current it causes the drive magnet 9 to rotate, and the hub 4 rotates integrally with the drive magnet 9.

In the magnetic disc drive motor shown in FIG. 6, in order to make the device smaller and thinner, the motor is housed inside the hub on which the magnetic discs are loaded. A cylindrical support 12 is formed in the central part of a frame 11, and ball bearings 13, 13 are mounted on the inner surface of this support 12. A shaft portion 15, integral with the hub 14, is rotatably mounted in the bearings 13, 13. Magnetic discs 5 are mounted on the outside of the hub 14.

An armature core 16 is mounted on the outer peripheral surface of the support 12 of the frame 11, a drive magnet 17 is fixed on the inner surface of the hub 14, the armature core 16 and the drive magnet 17 and other parts make up a motor, this motor rotates the drive magnet 17 so as to rotate the hub 14 together with the drive magnet 17.

In the conventional magnetic disc drive motors described above, because they incorporate the hub 4 for mounting the magnetic discs 5, the precision of coupling the hub 4 with the ball bearings 3 and the precision of machining the hub 4 directly affect the precision of the rotation of the magnetic discs 5, and the precision of the magnetic discs 5 rotation is therefore impaired. Also, because the diametral thickness of the hub 4 has to be accommodated, there is the problem that it is difficult to reduce the size of the motor, and, in particular, when high density magnetic discs 5 which are both of small diameter and capable of high density recording are used, because the diameters of the shaft 2 and the ball bearings 3 have to be made small, problems such as shaft deflection occur, and the practical application of these high performance discs is difficult.

SUMMARY OF THE INVENTION

In view of the foregoing problem, an object of the present invention is to provide a magnetic disc drive motor which has a simple and compact construction and with which highly precise rotation can be achieved.

According to an aspect of the present invention, there is provided a magnetic disc drive motor comprising a frame; a fixed shaft mounted on the frame; a lower bearing member mounted on a lower portion of the fixed shaft, the lower bearing member being provided with a roller ring rotating about the fixed shaft, the lower bearing member being provided with a loading portion defined at one end of the roller ring; an upper bearing member mounted on the upper portion of the fixed shaft, the upper bearing member being provided with a cylindrical roller ring; and a motor including: a rotor fixed under a loading surface portion of the loading portion of the lower bearing member; and a stator disposed inside the rotor and fixed to a frame, wherein each of the roller rings is fitted in the center hole of a. magnetic disc and an inner peripheral portion of the magnetic discs are loaded on the loading portion.

According to the magnetic disc drive motor of the present invention, because the magnetic discs are mounted with their inner edges fitted in direct contact with the roller rings of the bearing members which are rotatably mounted on the fixed shaft, and with their inner edge portions loaded on the loading surface of the lower roller ring, the magnetic discs can be rotated with a high degree of precision on high precision ball bearings without being affected by the precision of the fit between any hub and the ball bearings or the precision with which any hub is machined, as they conventionally have been, and the realization of high capacity disc drives is therefore made easy.

Furthermore, because the hub is dispensed with and a diametrally thick hub is no longer interposed between the bearings and the magnetic discs, magnetic discs having small center holes can be used, and when magnetic discs having regular sized center holes are used the diameter of the fixed shaft can be increased and therefore the strength and vibration resistance of the shaft can be increased. And, because the high precision and expensive hub that has conventionally been necessary is no longer needed, the size of the device can be reduced by an amount corresponding to the thickness of the hub, the motor can therefore easily be made smaller, and cost savings from the elimination of the hub can be made

DETAILED DESCRIPTION OF THE PREFERRED EMBODIMENTS

A first preferred embodiment of a magnetic disc drive motor according to the present invention will now be described, with reference to the accompanying drawings.

Figure 1:
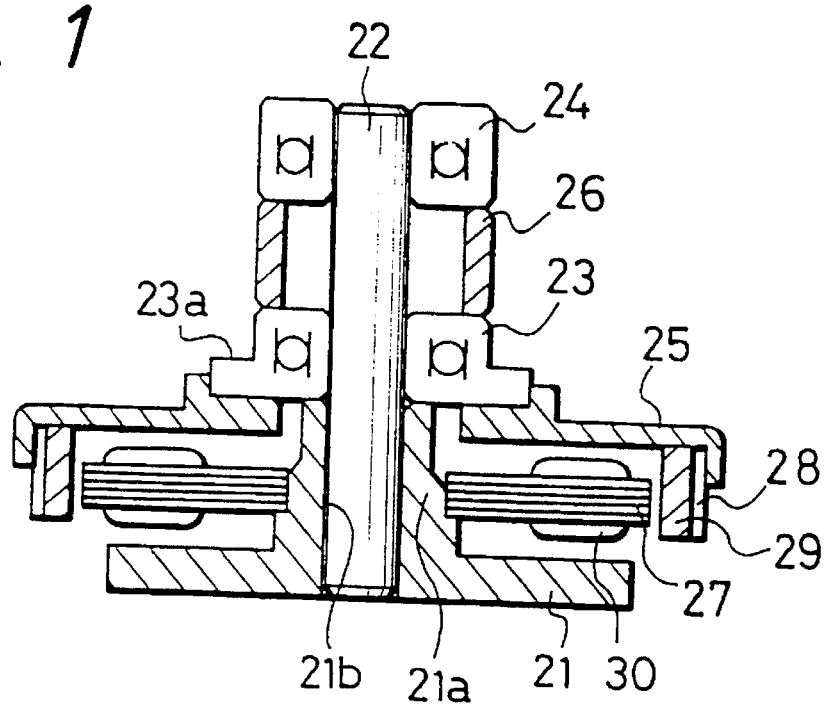
FIG. 1 is a cross-sectional view of a magnetic disc drive motor constructed according to a first preferred embodiment of the present invention.

In FIG. 1, a boss portion 21a projects up from the central portion of a frame 21, and a cylindrical fixed shaft 22 is mounted vertically in an axial center hole 21b formed in the boss portion 21a. This fixed shaft 22 does not have to be a separate member from the frame 21, as it is in FIG. 1, and can instead be formed as an integral part of the frame 21, projecting vertically upward from the central portion of the frame 21. The inner rings of an upper bearing member and a lower bearing member consisting of a pair of ball bearings 23, 24 are mounted on the lower and upper portions of the fixed shaft 22, and the inner ring of the lower ball bearing 23 is brought into contact with the upper end surface of the boss portion 21a. A loading portion 23a extends out radially from one end of the outer ring that is the rolling ring of the lower bearing member. The central portion of a generally plateshaped rotor 25 is fixed to the underside of this loading portion 23a, and this rotor 25 is thereby rotatably supported on the fixed shaft 22 by the lower ball bearing 23.

A collar 26 is held between the outer rings of the lower and upper ball bearings 23 and 24. When the inner rings of the upper and lower ball bearing are being fitted onto the fixed shaft 22, the inner rings are fixed to the shaft 22 with adhesive or the like while a suitable downward pressure is applied to the inner ring of the upper ball bearing 24, with the collar 26 in position between the outer rings of the bearings. In this way, the ball bearings 23 and 24 are provided with a pre-load.

An armature core 27 is mounted on a step portion formed in the outer surface of the boss portion 21a of the frame 21; this armature core 27 has a number of salient poles on its outer side, and a coil 30 is wound around each of the salient poles; the armature core 27 and the coils 30 make up a stator. A drive magnet 29 is mounted on the inner surface of the cylindrical peripheral portion of the rotor 25 through a back yoke 28 consisting of a magnetic body such as a steel plate. The outer surface of the armature core 27 and the inner surface of the drive magnet 29 face each other with a fixed predetermined radial gap; when an electric current is passed through the coils 30 to rotate the drive magnet 29, the rotor 25 and the outer rings of the ball bearings 23 and 24 rotate integrally with the drive magnet 29.

Figure 2:
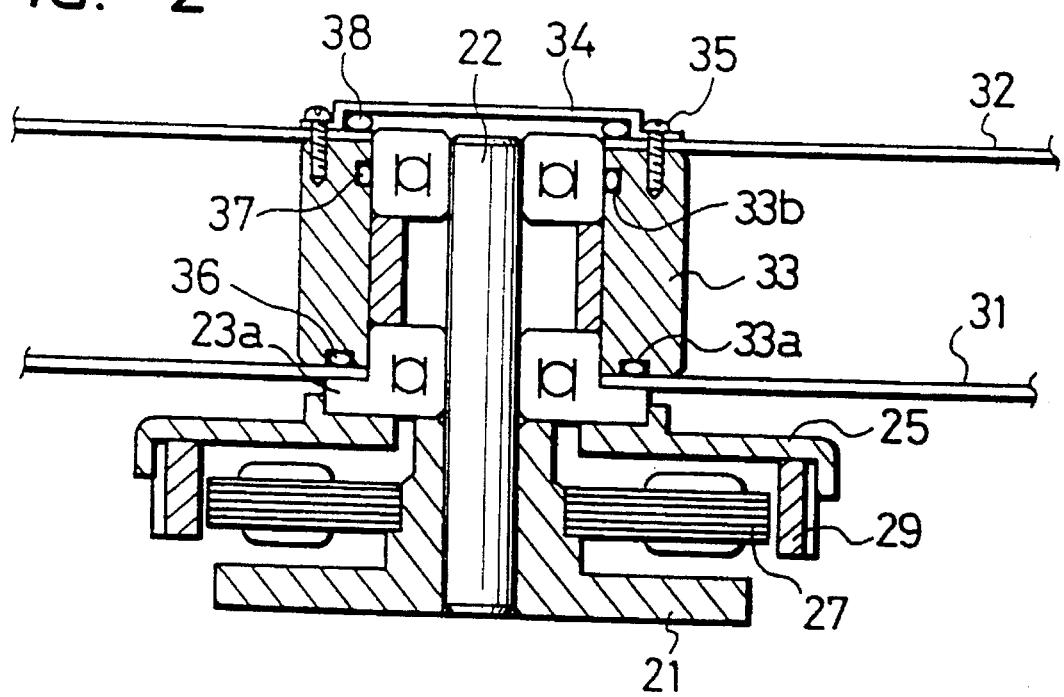
FIG. 2 is a cross-sectional view of the magnetic disc drive motor of FIG. 1 loaded with magnetic discs.

As shown in FIG. 2, inner holes of magnetic discs 31 and 32 are fitted on the outer rings of the ball bearings 23 and 24, respectively. The magnetic disc 31 is fitted on the ball bearing 23 and the inner peripheral portion of the magnetic disc 31 is positioned on the loading surface 23a. A disc spacer 33 is positioned on the upper surface of the magnetic disc 31, and the magnetic disc 32, fitted on the outer ring of the ball bearing 24, is mounted on top of the disc spacer 33. A disc clamper 34 is mounted on top of the magnetic disc 32, and the disc clamper and the magnetic disc 32 are both fixed to the disc spacer 33 by screws 35.

A circular groove 33a is formed in the lower surface of the disc spacer 33, another circular groove 33b is formed in the inner surface of the disc spacer 33, facing the outer ring of the ball bearing 24, and O-rings 36 and 37 are fitted in these circular grooves 33a and 33b, respectively. Also, another O-ring 38 is provided between the disc clamper 34 and the magnetic disc 32. These O-rings all function as sealing means.

In loading the magnetic discs 31 and 32 onto the device, first the magnetic disc 31 is fitted over the ball bearing 23 and positioned on the loading surface 23a. Then the disc spacer 33 is fitted into place and, with the O-rings 36 and 37 compressed, fixed with adhesive or the like to the outer rings of the ball bearings 23 and 24. Then the O-ring 38 is positioned on the upper surface of the magnetic disc 32, the disc clamper 34 is positioned on top of the O-ring 38, and the screws 35 are screwed into the disc spacer 33, compressing the O-ring 38 and holding it in place between the magnetic disc 32 and the disc clamper 34. Positioning the O-rings 36, 37 and 38 in this way results in the space in which the ball bearings 23 and 24 are mounted being sealed off from the outside, and consequently any oil mist or the like that might be sprayed out from the ball bearings 23 and 24 is prevented from getting out onto the recording surfaces of the magnetic discs 31 and 32. Any or all of these O-rings can be dispensed with when the ball bearings 23 and 24 produce negligible quantities of dust or are themselves well sealed.

Figure 3:
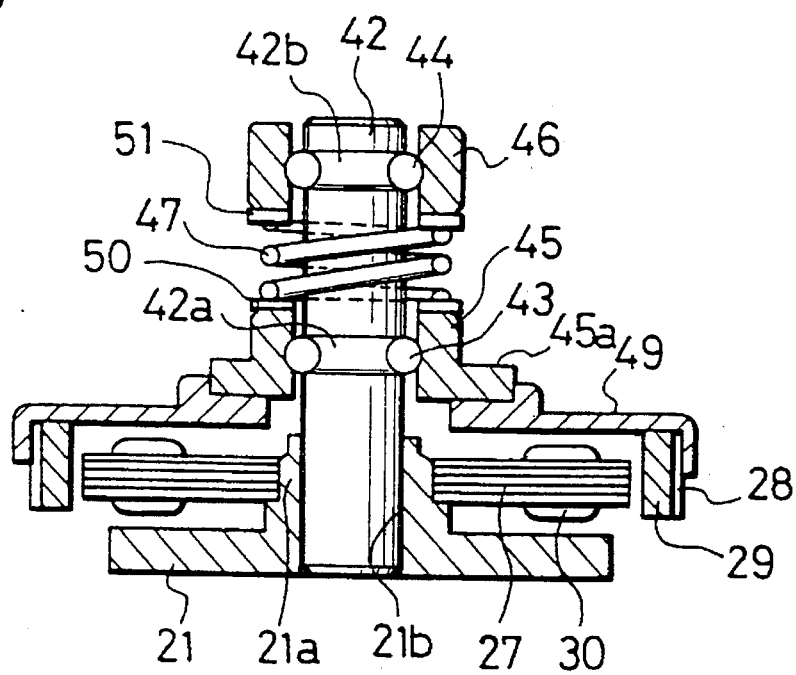
FIG. 3 is a cross-sectional view of a second preferred embodiment.
Figure 4:
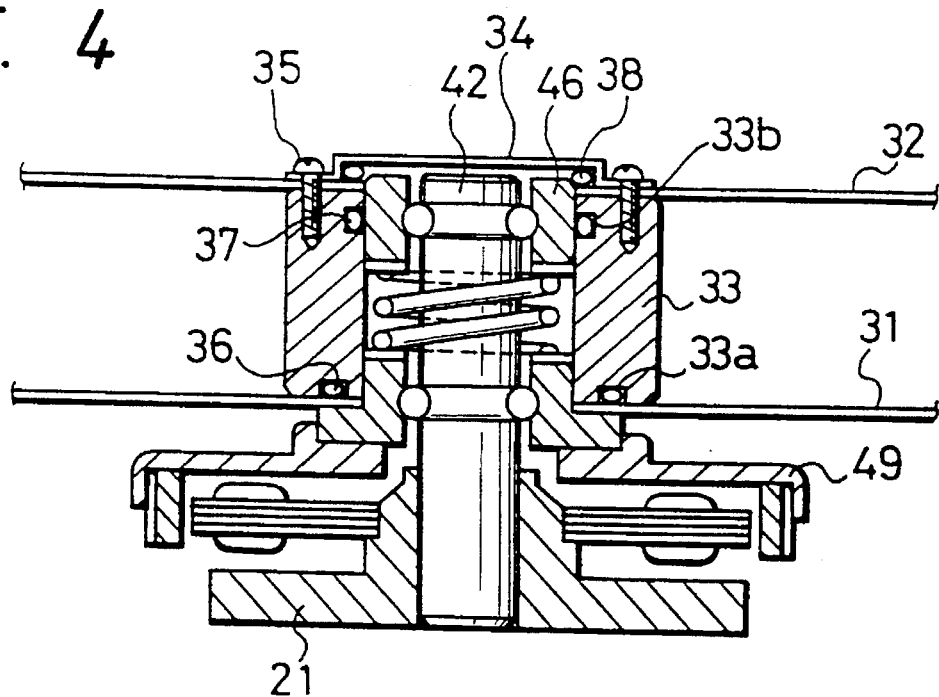
FIG. 4 is a cross-sectional view of the second preferred embodiment of FIG. 3 loaded with magnetic discs.
Figure 5:
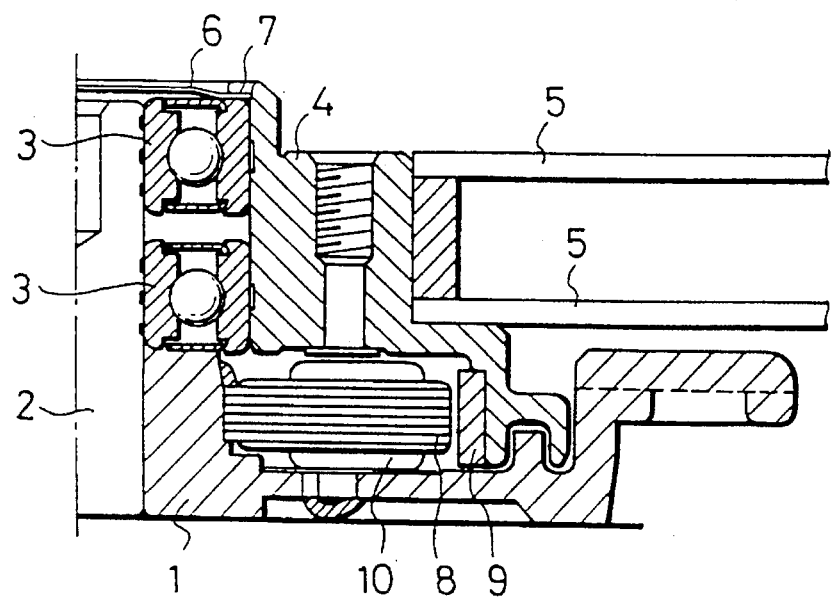
FIG. 5 is a cross-sectional view of a conventional magnetic disc drive motor.
Figure 6:
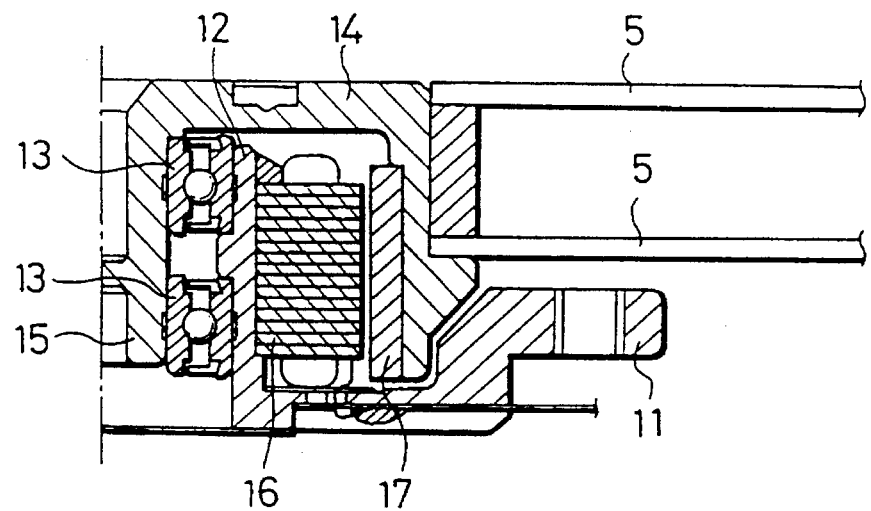
FIG. 6 is a cross-sectional view of another conventional magnetic disc drive motor.

FIGS. 3 and 4 are views of a magnetic disc drive motor constructed according to a second preferred embodiment of the present invention. In this second preferred embodiment, the upper and lower bearing members are integral-shaft type bearings; the upper and lower rolling rings are mounted on balls disposed in two circumferential grooves formed in the fixed shaft, a spring for pre-loading the bearings is interposed between the rolling rings, a loading portion is formed as an integral part of the lower roller ring and projects out radially from one end of the lower roller ring, and the inner edge portions of the magnetic discs are loaded on this loading portion.

Specifically, in this second preferred embodiment, the integrated-shaft type bearing members are made up of an upper-lower pair of circumferential grooves 42a and 42b formed in a fixed shaft 42, a number of balls 43, 44 disposed in the circumferential grooves 42a and 42b, and lower and upper roller rings 45 and 46 rotatably mounted on the fixed shaft via the balls 43, 44. Also, a coil spring 47 for pre-loading the bearing members is interposed between the upper and lower roller rings 45 and 46. The pre-loading coil spring 47 exerts an elastic force on both the roller rings 45 and 46 in opposite directions, tending to push them away from each other, and this force serves as a pre-load for preventing vibration and bearing shake from occurring when the roller rings rotate. In FIG. 3, the reference numerals 50 and 51 denote spacers mounted between the roller rings 45, 46 and the spring 47. When this kind of integrated-shaft type bearing construction is used, the diameter of the bearings can be reduced by an amount corresponding to the diametral thickness of the inner bearing rings which have been dispensed with.

A loading portion 45a is formed as an integral part of the lower roller ring 45 and projects out radially from the bottom end of the lower roller ring 45. The central portion of a generally plate-shaped rotor 49 is mounted on the underside of this loading portion 45a, and this rotor 49 is thereby rotatably supported on the fixed shaft 42 by the lower bearing member. A stator section is made up of an armature coil 27, fixed to the frame 21, provided with multiple salient poles each wound with a coil 30; a drive magnet 29 is fixed to the inner surface of the rotor 49 through the back yoke 28 made of, for example, an iron plate to face the outer peripheral surface of armature core 27

The magnetic discs 31 and 32 are fitted on the bearing member roller rings 45 and 46, respectively, and the magnetic disk 31 is fitted on the lower roller ring 45 the inner peripheral portion of the magnetic disc 31 is also mounted on the loading surface 45a of the roller ring 45. Other details of this preferred embodiment, such as the fixing of the magnetic disc 31 and the magnetic disc 32 by means of the spacer 33 and the clamper 34, and the positioning of the O-rings 36 37 and 38 to seal off the space in which the bearing members are mounted, are the same as in the first preferred embodiment described above, and therefore a description of them here will be omitted.

It is noted that various changes can be made to the constructions described above without exceeding the scope of the present invention. For example, although the first and second preferred embodiments described above are constructed as so-called cored radially facing brushless motors, with the drive magnet 29 facing the outer surface of the armature core 27 across a radial gap, a coreless, axially facing type brushless motor construction, with a flat magnet facing multiple armature coils disposed on a flat plane, may alternatively be adopted.

As is clear from the above description, with a magnetic disc drive motor according to this invention, because the magnetic discs are mounted with their inner edges fitted in direct contact with the roller rings of the bearing members which are rotatably mounted on the fixed shaft, and with their inner edge portions loaded on the loading surface of the lower roller ring, the magnetic discs can be rotated with a high degree of precision on high precision ball bearings without being affected by the precision of the fit between any hub and the ball bearings or the precision with which any hub is machined, as they conventionally have been, and the realization of high capacity disc drives is therefore made easy.

Furthermore, because the hub is dispensed with and a diametrally thick hub is no longer interposed between the bearings and the magnetic discs, magnetic discs having small center holes can be used, and when magnetic discs having regular sized center holes are used the diameter of the fixed shaft can be increased and therefore the strength and vibration resistance of the shaft can be increased. And, because the high precision and expensive hub that has conventionally been necessary is no longer needed, the size of the device can be reduced by an amount corresponding to the thickness of the hub, the motor can therefore easily be made smaller, and cost savings from the elimination of the hub can be made.

What is claimed is:

1. A magnetic disc drive motor comprising:

a frame;

a fixed shaft mounted on the frame;

a lower bearing member mounted on a lower portion of the fixed shaft, the lower bearing member being provided with an outer roller ring rotating about the fixed shaft, the lower bearing member being provided with a loading portion defined at one end of the outer roller ring;

an upper bearing member mounted on an upper portion of the fixed shaft, the upper bearing member being provided with a cylindrical, outer roller ring;

a spring, for pre-loading the bearings, interposed between the outer roller ring of the lower bearing member and the cylindrical, outer roller ring of the upper bearing member; and a motor including:

an inverted cup-shaped rotor fixed under a loading surface portion of the loading portion of the lower bearing member, said rotor defining a generally vertical, inner cylindrical surface having a drive magnet mounted thereon; and a stator disposed inside the rotor so as to face said drive magnet and fixed to the frame, wherein each of the outer roller rings is fitted in the center hole of a respective magnetic disc and an inner peripheral portion of the magnetic discs is loaded on the loading portion, further wherein the upper and lower bearing members comprise integral-shaft type bearings so that the upper and lower outer roller rings are mounted on balls disposed in two circumferential grooves formed in the fixed shaft with a predetermined distance, said spring being interposed between the upper and lower outer roller rings, and the loading portion is integrally formed on the lower outer roller ring and projects radially outwardly from the lower outer roller ring so as to be perpendicular with respect to the lower outer roller ring, and the inner peripheral portions of the magnetic discs are loaded on the loading portion.

* * * * *